F. CRAWFORD, Sr.
STOP MOTION BRAKE ATTACHMENT.
APPLICATION FILED JAN. 22, 1919.

Patented Sept. 5, 1922.

Inventor:
Frank Crawford Sr.
by his Attorneys,
Howson & Howson

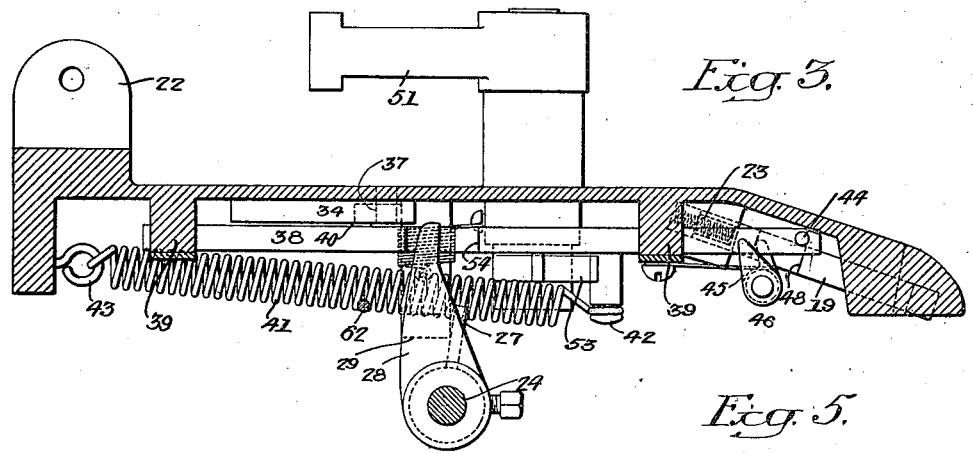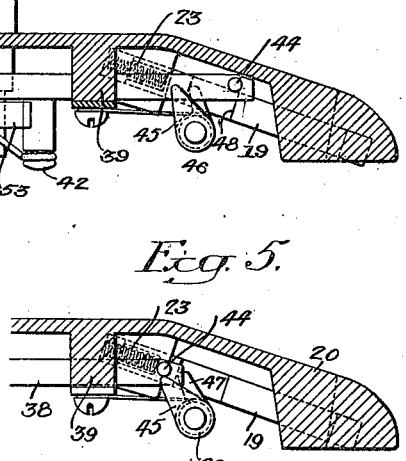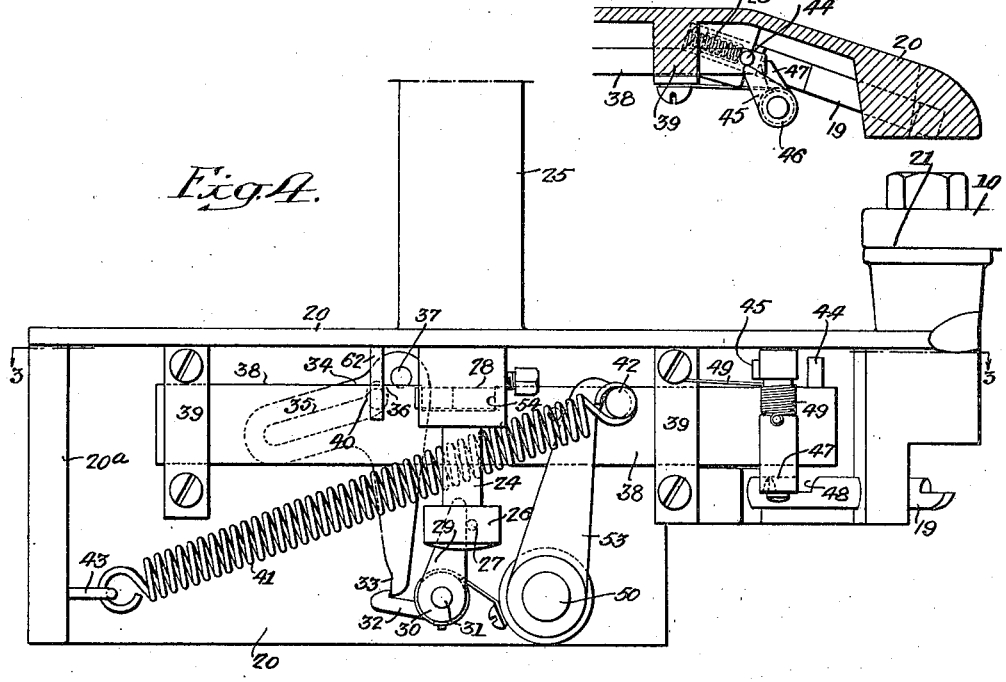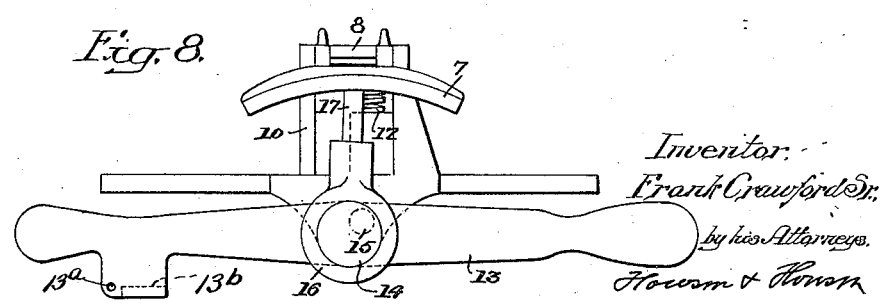

F. CRAWFORD, Sr.
STOP MOTION BRAKE ATTACHMENT.
APPLICATION FILED JAN. 22, 1919.

1,428,416.

Patented Sept. 5, 1922.
3 SHEETS—SHEET 3.

Inventor
Frank Crawford Sr.
by his Attorneys,
Howson & Howson

Patented Sept. 5, 1922.

1,428,416

UNITED STATES PATENT OFFICE.

FRANK CRAWFORD, SR., OF NEW BRUNSWICK, NEW JERSEY, ASSIGNOR TO THE CRAWFORD MANUFACTURING COMPANY, OF NEW BRUNSWICK, NEW JERSEY, A CORPORATION OF NEW JERSEY.

STOP-MOTION BRAKE ATTACHMENT.

Application filed January 22, 1919. Serial No. 272,537.

*To all whom it may concern:*

Be it known that I, FRANK CRAWFORD, Senior, a citizen of the United States, and a resident of New Brunswick, county of Middlesex, State of New Jersey, have invented certain Improvements in Stop-Motion Brake Attachments, of which the following is a specification.

My invention relates to certain improvements in brake mechanisms for knitting and like machines.

One object of my invention is to provide means for automatically releasing the brake control mechanism to allow the brake to be applied when a stop motion is actuated due to the breaking of a thread, the knotting of a thread, or the disarrangement of the needles.

A further object of the invention is to provide means whereby the latch can be reset automatically so as to engage the mechanism which holds the brake out of action, the other mechanism being set by hand before the machine is in condition to be operated.

In the accompanying drawings:

Fig. 3 is a sectional plan view, drawn to an enlarged scale, showing the two release mechanisms, the section being on the line 3—3, Fig. 4;

Fig. 4 is a side view of Fig. 3 showing the brake control mechanism;

Fig. 5 is a view showing the latch withdrawn and about to be released;

Fig. 8, is a face view of the brake.

Figure 1:
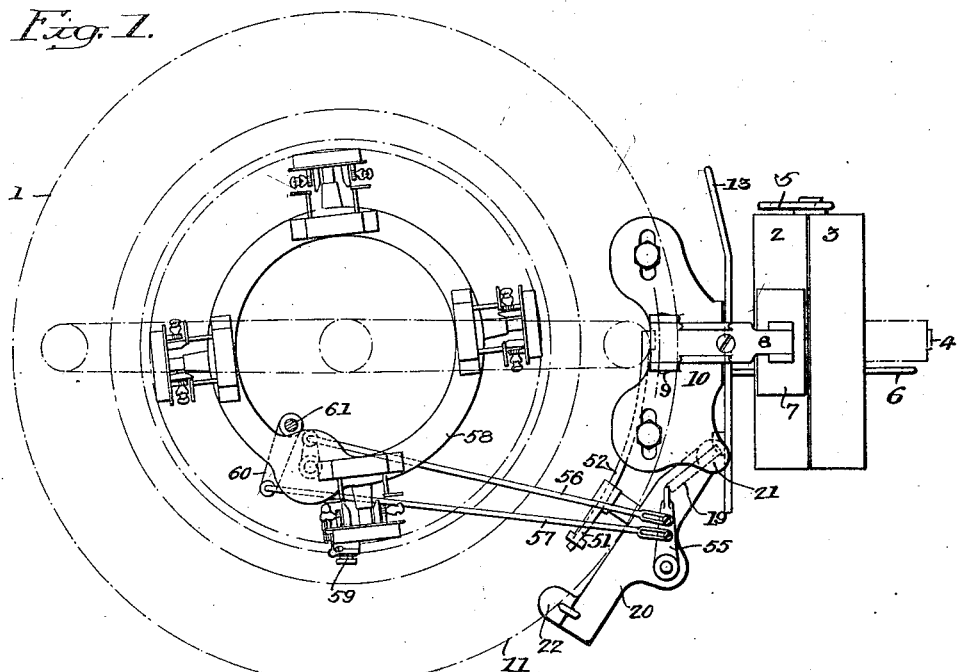
Fig. 1 is a plan view showing the outline of a knitting machine in dotted lines and illustrating the brake mechanism in full lines and one stop motion.
Figure 2:
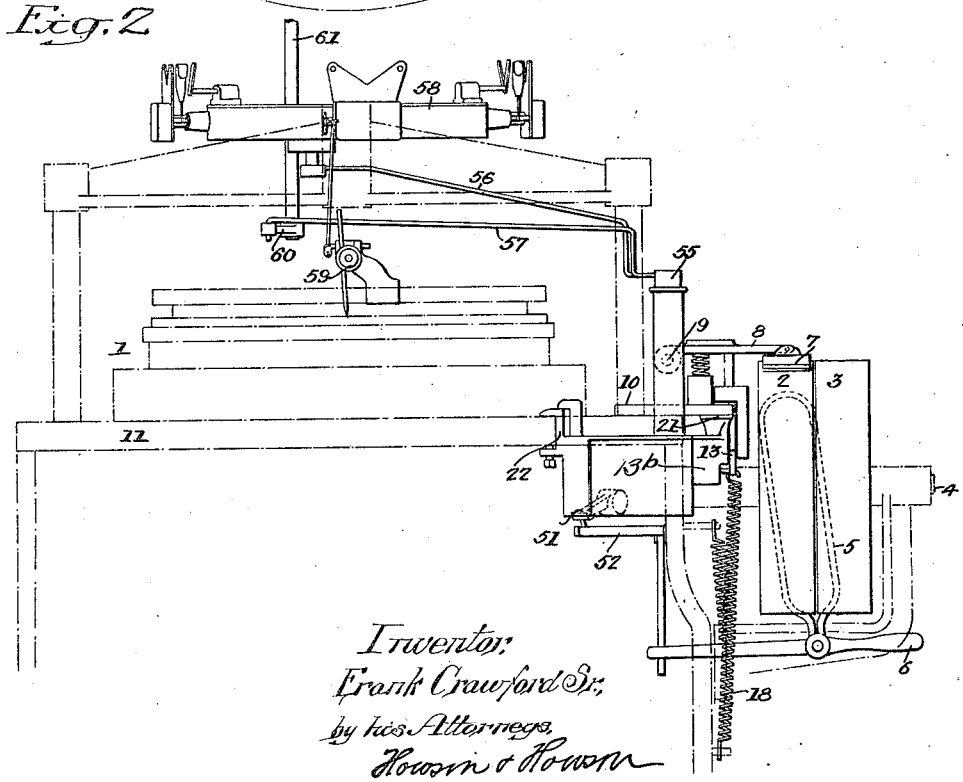
Fig. 2 is a side view of Fig. 1, showing two stop motions connected to the brake release mechanism.

The frame of the knitting machine is shown by dotted lines at 1, Figs. 1 and 2. 2 is the fast pulley and 3 is the loose pulley, which is mounted on the shaft 4, shown by dotted lines, and around which the driving belt passes. 5 is the shifter through which the belt extends and this has a lever, one arm being arranged to be actuated by the mechanism when one of the stop motions is released, and the other arm being in the shape of a handle so that the shifter can be moved by hand. 7 is a brake located over the fast pulley 2. This brake is pivotally mounted on a lever 8 pivoted at 9 to bearings on a frame 10 secured to the base plate 11 of the knitting machine shown by dotted lines. A spring 12 tends to lift the brake and to hold it out of action. A lever 13 has an eccentric boss 14 mounted on a pin 15 projecting from the frame 10 and extending around the eccentric boss is a band 16 connected by a screw threaded rod 17 with the lever 8 carrying the brake 7. A spring 18 is attached to one arm of the lever 13 at 13$^a$ and to a pin on the frame of the machine, as shown in Fig. 2. The lever is held in position to hold the brake out of contact with the pulley 2 by a bolt 19, which projects under the lip 13$^b$ on the lever 13. When the bolt 19 is withdrawn, the spring 18 will turn the lever on its pivot and the eccentric will apply the brake. The bolt 19 is adapted to slide on a frame 20, which is secured to the frame 10 at 21 and to the base 11 of the knitting machine at 22. The bolt 19 is retracted by mechanism, which I will now proceed to describe.

When one of the stop motions is actuated so as to release the lever 13 and to apply the brakes, the bolt is immediately returned to its normal position, as soon as the brake is applied. When it is wished to release the brake, all that is necessary is to raise the lever against the action of its spring and, as the lever comes in contact with the beveled edge of the bolt 19, it will push back the bolt against the pressure of the bolt spring 23 and the bolt will immediately be projected under the lever holding it and the brake out of action.

24 is a spindle which extends through a standard 25 projecting from the frame 20. On the lower end of this spindle is a head 26 having a pin 27, and also on the spindle is a lever 28, which is secured, in the present instance, to the spindle by a set screw. The pin 27 engages an arm 29 of a lever 30, which is mounted on a pin 31 projecting from the frame 20 and on the lever is a hooked arm 32 which engages one arm 33 of a lever 34. This lever has a slot 35 with one end offset, as at 36. The lever is mounted on a pivot pin 37 projecting from the frame 20.

38 is a sliding bar adapted to bearings 39 on the frame 20. On this bar is a pin 40, which extends into the slot 35 of the lever 34. The spring 41 is secured to a pin 42 on the sliding bar 38 and is adapted to an eye 43 on the frame 20. The spring tends to retract the sliding bar as soon as it is released on the movement of the latch arm 32. A pin 44 on one end of the sliding bar engages an arm 45 of a lever 46, which has an arm 47 that enters the notch 48 in the bolt 19. On the retraction of the sliding bar by its spring the pin 44 will engage the arm 45 and, through the lever, will retract the bolt 19 against the pressure of its spring 23 to the position illustrated in Fig. 5, and as soon as the pin 44 passes the end of the arm 45 the spring 23 will again project the bolt so that it will be in position to latch the lever 13 of the brake mechanism. A coiled spring 49 on the lever 46 is attached to a fixed portion of the frame so that it will return the lever to its normal position, as shown in Fig. 3. Mounted in the bearing in the frame 20 is a shaft 50 having at one end an arm 53, which engages with pin 42 of sliding bolt 38 and on the other end an arm 51, which engages the release lever 52. This lever 52 is of the ordinary construction and is pivoted to the base of the machine and holds the shifting lever 6 in position in line with the fast pulley. The lever 28 which is on the spindle 24 mentioned above enters a slot 54 in the sliding bar 38 and is for the purpose of moving the bar and, with it, the mechanism to the setting position illustrated in Fig. 4. This is accomplished by turning the handle 55 on the end of the spindle.

Figure 6:
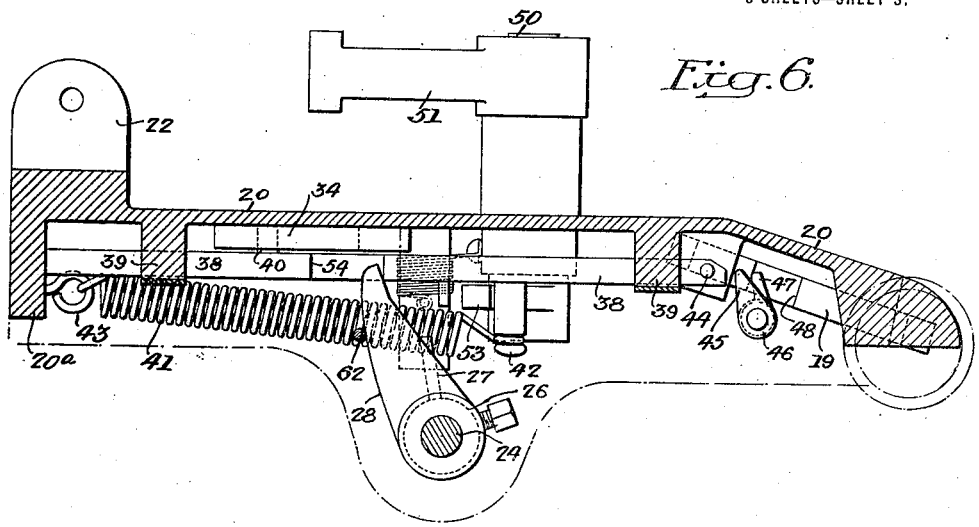
Fig. 6 is a sectional view, similar to Fig. 3, showing the brake control mechanism released and the latch moved forward in position to again lock the brake mechanism out of action.
Figure 7:
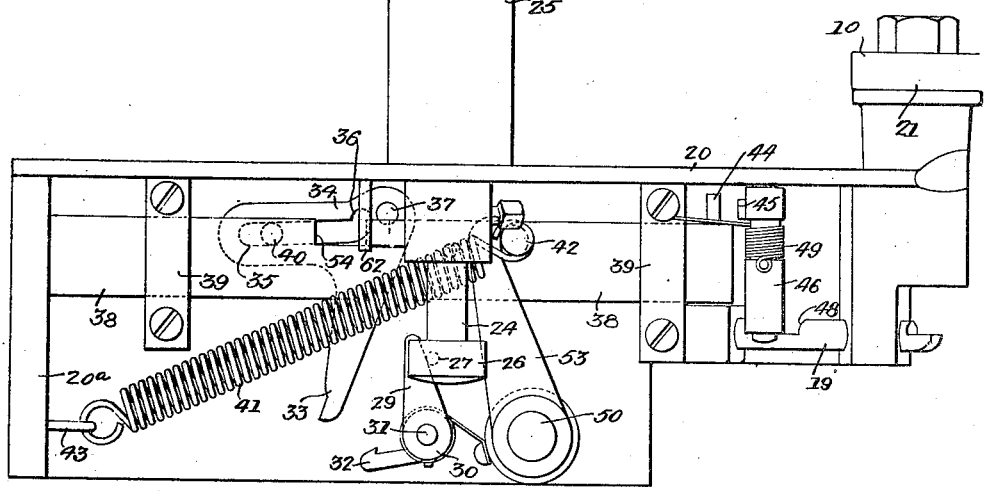
Fig. 7 is a side view of the brake control mechanism in a position corresponding to the showing in Fig. 6.

62 is a stop pin which limits the rearward movement of the lever arm 28, the rearward movement of the sliding bar 38 being limited by the portion 20ª of the frame, Figs. 6 and 7. Connected to the handle 55 are two rods 56 and 57, the rods being slotted at one end and being adapted to pins on the handle, as clearly shown in Fig. 1. One of these rods is connected to the stop motion 58, which is controlled by the needle detector 59, as well as the drop wires which operate when the thread breaks, while the other rod 57 is connected to an arm 60 on a rod 61 extending to the stop motion, which is actuated when a thread breaks, or a knot occurs in the thread. These two stop motions have not been illustrated in detail, as they form no part of the present invention, since the rods 57 and 56 may be connected to any type of stop motion and the handle 55 may be connected to one stop motion only, when there is but one employed on a machine.

It will be seen by the above construction that if a thread breaks, or a knot occurs, or, in the present instance, if one of the needles should be out of line, one of the stop motions will positively move the handle 55 and, with it, the spindle 24. This movement will actuate the latch arm 32, which will immediately release the lever 34, which, in turn, will release the sliding bar 38. The spring 41 will retract the bar, moving it from the position illustrated in Fig. 4 to that illustrated in Fig. 7. This movement withdraws the bolt 19, which releases the lever 13 of the brake, and a spring of this lever applies the brake to the fast pulley 2. The bolt is withdrawn and is immediately returned, as described above. In the meantime, the arm 51 on the shaft 50 releases the belt shifting mechanism so that the belt shifter is shifted simultaneously with the appliance of the brake, insuring prompt stopping of the knitting machine. The bolt 19 is immediately projected and is in position so that when the lever 13 is raised it releases the brake which engages the lever and holds it and the brake out of action. The mechanism can be reset by turning the handle 55 of the rod 24, which will move the sliding bar longitudinally, at the same time bringing the latch arm into engagement with the arm 33 of the lever 34. In this position, the mechanism is set so that the knitting will proceed until one of the stop motions actuates the mechanism.

I claim:

1. The combination in a brake release for knitting machines, of a brake; a lever for actuating the brake; a spring-pressed bolt for holding the lever and the brake in the raised position; a sliding bar; a spring for retracting the bar; a lever having two arms, one arranged to be engaged by the bar and the other arranged to engage the bolt; a shaft; an arm on the shaft engaging the bar; a slotted lever for retaining the bar in the projected position against the pressure of the spring; a latch for engaging the slotted lever; and means for releasing the latch.

2. The combination in a brake release for knitting machines, of a brake; a lever for actuating the brake; a bolt for holding the lever and the brake in the raised position; a sliding bar; a lever connecting the sliding bar with the bolt so that, on the movement of the sliding bar, the bolt will be retracted and will immediately release the brake; a spring for retracting the bar; a slotted lever; a pin on the bar entering the slot in said lever; a pivoted latch lever engaging the slotted lever; a spindle having an arm arranged to actuate the latch lever; and a stop motion connected to the spindle so that, when the stop motion is actuated, the spindle will be turned and will release the latch, allowing the sliding bar to be moved by its spring and to retract the bolt.

3. The combination in a brake release for knitting machines, of a brake; a lever for actuating the brake; a spring bolt for holding the lever in its raised position and the brake out of action; a sliding bar; a lever located between the bar and the bolt and arranged to actuate the bolt when the bar is retracted; a spring for retracting the bar; a lever for holding the bar projected against the pressure of the spring; a latch for engaging said lever; a stop motion; a spindle actuated by the stop motion; an arm on the spindle arranged to engage the latch; and a second arm on the spindle engaging the bar so that, when the spindle is turned by hand, the bar can be reset and the latch will reengage the lever which holds the bar in its projected position.

4. The combination in a brake release for knitting machines, of a fast pulley; a brake arranged to engage the pulley; a lever on which the brake is mounted; a spring-actuated lever arranged to apply the brake; a bolt arranged to engage the last mentioned lever and to hold it out of action; a sliding bar; a frame in which the bar is mounted, said bar having a pin; a bolt actuating-lever having two arms, one arm engaging the bolt and the other arm extending into the path of the pin on the bar; a spring on said bolt-actuating lever to return the lever to its normal position; a spring for retracting the bar; a pivoted, slotted lever, the slot in the lever being offset at one end; a pin on the sliding bar extending into the slot of said lever; a hooked arm engaging the slotted lever; a stop motion; means actuated by the stop motion for moving the hooked arm to release the slotted lever; a shaft having an arm engaging the sliding bar, said shaft having another arm; and belt shifting mechanism actuated by the said latter arm.

In witness whereof I affix my signature.

FRANK CRAWFORD, Senior.